(12) United States Patent
Kishi et al.

(10) Patent No.: US 9,664,415 B2
(45) Date of Patent: May 30, 2017

(54) HOT-WATER HEAT PUMP AND METHOD OF CONTROLLING THE SAME

(75) Inventors: Makoto Kishi, Tokyo (JP); Minoru Matsuo, Tokyo (JP); Seiichi Okuda, Tokyo (JP); Masaharu Nitta, Tokyo (JP); Tatsuru Nagai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 545 days.

(21) Appl. No.: 13/520,229

(22) PCT Filed: Feb. 22, 2011

(86) PCT No.: PCT/JP2011/053768
§ 371 (c)(1),
(2), (4) Date: Jul. 2, 2012

(87) PCT Pub. No.: WO2011/108392
PCT Pub. Date: Sep. 9, 2011

(65) Prior Publication Data
US 2012/0280052 A1    Nov. 8, 2012

(30) Foreign Application Priority Data

Mar. 5, 2010    (JP) ................................ 2010-048886

(51) Int. Cl.
*F24D 3/18* (2006.01)
*F24H 4/02* (2006.01)
(Continued)

(52) U.S. Cl.
CPC ................. *F24H 4/02* (2013.01); *F24D 3/18* (2013.01); *F24D 19/1021* (2013.01);
(Continued)

(58) Field of Classification Search
CPC .. F24D 3/18; F24D 2200/12; F24D 2200/123; F24D 19/1039; F24D 19/1021;
(Continued)

(56) References Cited

U.S. PATENT DOCUMENTS 1,611,764 A * 12/1926 Mendelson ............. F24D 3/087
122/15.1
2,619,326 A * 11/1952 McLenegan ................... 165/240
(Continued)

FOREIGN PATENT DOCUMENTS

CN    2392132 Y    8/2000
DE    2721301 A1 * 11/1978 ............. F24D 12/02
(Continued)

OTHER PUBLICATIONS

"DE_19620399_A1_M - Machine Trans.pdf", Machine Translation, http://epo.org, May 11, 2015.*
(Continued)

*Primary Examiner* — Gregory Huson
*Assistant Examiner* — Daniel E Namay
(74) *Attorney, Agent, or Firm* — Westerman, Hattori, Daniels & Adrian, LLP

(57) ABSTRACT

A hot-water heat pump that is capable of reducing installation costs and installation space and also reducing the heating time of a hot-water route, and a method of controlling the same are provided. The hot-water heat pump (1) is provided with a hot-water-heat-pump main unit (2) that includes a thermal output heat exchanger that absorbs heat from a heat-source route and outputs heat; hot-water route (5 and 6) that receive heat outputted from the thermal output heat exchanger; a three-way valve (4) provided in the outlet-side hot-water route (6); and a controller that controls the hot-water-heat-pump main unit (2) and the three-way valve (4), wherein the controller controls the size of open- (Continued)

ings of the three-way valve (4) so that a portion of the outlet-side hot-water route (6) leading out of the thermal output heat exchanger is guided to an upstream side of the thermal output heat exchanger.

7 Claims, 8 Drawing Sheets

(51) Int. Cl.
  *F24D 19/10* (2006.01)
  *F24H 9/20* (2006.01)
  *F24D 11/02* (2006.01)
  *F24D 17/02* (2006.01)

(52) U.S. Cl.
  CPC ..... *F24D 19/1024* (2013.01); *F24D 19/1033* (2013.01); *F24D 19/1039* (2013.01); *F24H 9/2007* (2013.01); *F24D 2200/126* (2013.01); *F24D 2220/0235* (2013.01); *Y02B 30/12* (2013.01)

(58) Field of Classification Search
  CPC ........... F24D 19/1033; F24D 2220/126; F24D 2200/0235; Y02B 12/123; F24H 4/02; F24H 9/2007; F25B 2313/003; F25B 2313/004; B01D 1/0058
  USPC .............. 62/160, 181; 122/15.1, 18.1, 14.31, 122/14.22
  IPC ..................................... F24D 3/18,11/02, 17/02
  See application file for complete search history.

(56) References Cited

U.S. PATENT DOCUMENTS

| | | | | |
|---|---|---|---|---|
| 3,403,723 A * | 10/1968 | Meckler | ........................ | 165/210 |
| 3,490,517 A * | 1/1970 | Meckler | ........................ | 165/210 |
| 3,658,244 A * | 4/1972 | Caldwell | ............ | G05D 23/2439 |
| | | | | 236/37 |
| 3,989,183 A * | 11/1976 | Gustafsson | ................... | 237/2 B |
| 4,257,556 A * | 3/1981 | Skala | .................... | F24H 7/0433 |
| | | | | 165/10 |
| 4,341,263 A * | 7/1982 | Arbabian | .............. | F24D 11/005 |
| | | | | 165/104.14 |
| 4,498,622 A * | 2/1985 | Harnish | ........................ | 236/25 R |
| 4,522,253 A * | 6/1985 | Levin | .......................... | 165/207 |
| 4,569,331 A * | 2/1986 | Tani | ...................... | F24D 11/003 |
| | | | | 126/585 |
| 4,824,740 A * | 4/1989 | Abrams | ............ | H01M 8/04029 |
| | | | | 429/423 |
| 5,115,491 A * | 5/1992 | Perlman | .................. | F24D 17/00 |
| | | | | 122/14.3 |
| 5,366,151 A * | 11/1994 | King | .................... | B60H 1/2206 |
| | | | | 237/12.3 C |
| 5,613,372 A * | 3/1997 | Beal et al. | ........................ | 62/434 |
| 5,727,396 A * | 3/1998 | Boyd et al. | .................... | 62/323.1 |
| 5,918,805 A * | 7/1999 | Guyer | ..................... | F01K 17/02 |
| | | | | 237/2 A |
| 5,947,373 A * | 9/1999 | Saito et al. | .................... | 237/2 B |
| 6,109,346 A * | 8/2000 | Hill | ........................... | F02G 5/00 |
| | | | | 123/557 |
| 6,560,978 B2 * | 5/2003 | Renken et al. | ................... | 62/132 |
| 6,837,443 B2 * | 1/2005 | Saitoh et al. | .................... | 237/2 B |
| 6,862,894 B1 * | 3/2005 | Miles | ........................ | F25B 6/04 |
| | | | | 62/181 |
| 6,874,694 B2 * | 4/2005 | Saitoh et al. | .................... | 237/2 B |
| 7,234,646 B2 * | 6/2007 | Saitoh et al. | .................... | 237/2 B |
| 7,823,799 B2 * | 11/2010 | Sakai et al. | ...................... | 237/19 |
| 8,172,157 B2 * | 5/2012 | Nakagawa | .............. | F24D 11/005 |
| | | | | 237/12.1 |
| 8,191,618 B2 * | 6/2012 | Gering | .............. | B60H 1/00278 |
| | | | | 123/142.5 R |
| 8,245,948 B2 * | 8/2012 | Cho et al. | ..................... | 237/12.1 |
| 8,291,869 B2 * | 10/2012 | Min | ........................ | F23N 5/242 |
| | | | | 122/155.1 |
| 8,567,689 B2 * | 10/2013 | Eisenhower | ........ | F24D 17/0073 |
| | | | | 122/18.2 |
| 8,794,538 B2 * | 8/2014 | Park | .......................... | F24D 3/08 |
| | | | | 237/19 |
| 8,910,880 B2 * | 12/2014 | Farrell | ....................... | F24D 3/08 |
| | | | | 122/15.1 |
| 8,991,199 B2 * | 3/2015 | Honda | ...................... | F25B 7/00 |
| | | | | 62/160 |
| 2003/0178498 A1 * | 9/2003 | Saitoh et al. | .................. | 237/2 B |
| 2004/0194949 A1 * | 10/2004 | Ban | .................... | B60H 1/00314 |
| | | | | 165/287 |
| 2005/0167516 A1 * | 8/2005 | Saitoh et al. | .................. | 237/2 B |
| 2006/0071090 A1 * | 4/2006 | Eisenhower | ........ | F24D 17/0073 |
| | | | | 237/2 A |
| 2008/0022708 A1 * | 1/2008 | Cho | ........................ | F25B 13/00 |
| | | | | 62/238.7 |
| 2008/0023961 A1 * | 1/2008 | Cho et al. | ......................... | 290/2 |
| 2009/0090789 A1 * | 4/2009 | Zirkiyev | ..................... | F24D 10/00 |
| | | | | 237/8 A |
| 2009/0295158 A1 * | 12/2009 | Yuri | ...................... | F01K 23/065 |
| | | | | 290/2 |
| 2010/0038441 A1 * | 2/2010 | Pedersen | ...................... | 237/2 B |
| 2011/0016897 A1 * | 1/2011 | Akagi | ....................... | F24D 3/18 |
| | | | | 62/161 |
| 2011/0214444 A1 * | 9/2011 | Yoshii | .................. | F24H 4/04 |
| | | | | 62/160 |
| 2011/0271711 A1 * | 11/2011 | Yoshida | ................. | F25B 39/04 |
| | | | | 62/515 |
| 2011/0302949 A1 * | 12/2011 | Honda | ........................ | 62/324.6 |
| 2012/0000236 A1 * | 1/2012 | Ogata et al. | .................. | 62/324.2 |
| 2012/0018129 A1 * | 1/2012 | Ushijima et al. | ........ | 165/104.19 |
| 2012/0280052 A1 * | 11/2012 | Kishi | .................. | F24D 19/1021 |
| | | | | 237/2 B |
| 2012/0291460 A1 * | 11/2012 | Aoyagi | ................. | F25B 47/025 |
| | | | | 62/79 |

FOREIGN PATENT DOCUMENTS

| | | | | |
|---|---|---|---|---|
| DE | 3014029 A1 * | 10/1981 | | |
| DE | 3105373 A1 * | 11/1982 | .......... | F24D 11/0214 |
| DE | 3302065 A1 * | 8/1983 | .......... | F24D 19/1039 |
| DE | 3207435 A1 * | 9/1983 | .......... | F24D 19/1039 |
| DE | 3608867 A1 * | 9/1987 | .......... | F24D 19/1039 |
| DE | 19509419 A1 * | 9/1996 | ............ | E03B 7/045 |
| DE | 19620399 A1 * | 11/1997 | | |
| DE | 102 37 840 A1 | 3/2003 | | |
| DE | 10 2004 018 034 A1 | 11/2005 | | |
| EP | 0 035 085 A1 | 9/1981 | | |
| EP | 0138568 A2 * | 4/1985 | | |
| EP | 1 298 395 A2 | 4/2003 | | |
| EP | 1 845 313 A1 | 10/2007 | | |
| EP | 2159494 A2 * | 3/2010 | .......... | F24D 11/0214 |
| EP | 2273203 A2 * | 1/2011 | | |
| EP | 2 559 953 A1 | 2/2013 | | |
| EP | 2725310 A1 * | 4/2014 | | |
| FR | 2847972 A1 * | 6/2004 | ............ | F24D 3/087 |
| FR | 2947895 A3 * | 1/2011 | | |
| GB | 2090023 A * | 6/1982 | ........ | F24D 19/1012 |
| GB | 2235966 A * | 3/1991 | ........ | F24D 19/1066 |
| JP | 57021726 A * | 2/1982 | ............ | F24D 12/00 |
| JP | 57021727 A * | 2/1982 | ............ | F24D 12/00 |
| JP | 61-125540 A | 6/1986 | | |
| JP | 63032224 A * | 2/1988 | | |
| JP | 07-225062 A | 8/1995 | | |
| JP | 08-320149 A | 12/1996 | | |
| JP | 2842550 B2 | 1/1999 | | |
| JP | 2894602 B2 | 5/1999 | | |
| JP | 3075944 B2 | 8/2000 | | |
| JP | 3632357 B2 | 3/2005 | | |
| JP | 2005-98568 A | 4/2005 | | |
| JP | 2005-121283 A | 5/2005 | | |
| JP | 2005-207618 A | 8/2005 | | |
| JP | 2005-257268 A | 9/2005 | | |
| JP | 2005-345007 A | 12/2005 | | |
| JP | 2006177625 A * | 7/2006 | | |
| JP | WO 2007077687 A1 * | 7/2007 | ............ | F24D 17/02 |
| JP | 2007-309565 A | 11/2007 | | |
| JP | 2008-249164 A | 10/2008 | | |

(56) References Cited

FOREIGN PATENT DOCUMENTS

| JP | 2009274469 A | * | 11/2009 | |
| JP | WO 2009142004 A1 | * | 11/2009 | .......... F24D 11/0214 |
| JP | 2009-299941 A | | 12/2009 | |
| JP | WO 2012008431 A1 | * | 1/2012 | .......... F24D 11/0214 |
| JP | WO 2013038692 A1 | * | 3/2013 | ............. F24D 17/02 |
| WO | WO 2010098061 A1 | * | 9/2010 | |
| WO | WO 2010098069 A1 | * | 9/2010 | |
| WO | WO 2010098070 A1 | * | 9/2010 | .............. F25B 29/00 |
| WO | WO 2010098072 A1 | * | 9/2010 | .............. F25B 13/00 |

OTHER PUBLICATIONS

Extended European Search Report dated Oct. 18, 2013, issued in corresponding European Application No. 11750504.0.
Chinese Office Action dated Mar. 7, 2014, issued in corresponding Chinese Patent Application No. 201180007028.2, w/English translation (16 pages).
Office Action dated Jul. 8, 2014, issued in corresponding Japanese Patent Application No. 2010-048886, with English Translation (6 pages).
Korean Office Action dated Sep. 13, 2013, issued in corresponding Korean Patent Application No. 10-2012-7018525, w/ English Translation.
Japanese Office Action dated Jan. 21, 2014, issued in corresponding Japanese Patent Application No. 2010-048886 with English translation (6 pages).
International Search Report of PCT/JP2011/053768, mailing date Mar. 22, 2011.
Written Opinion of PCT/JP2011/053768, mailing date Mar. 22, 2011.
Korean Office Action dated Oct. 30, 2014, issued in corresponding KR Patent Application No. 10-2014-7021495 with English translation (10 pages).
Decision to Grant a Patent dated Mar. 10, 2015, issued in corresponding Japanese Patent Application No. 2010-048886 with English translation (7 pages).
Decision to Grant a Patent dated Aug. 25, 2015, issued in counterpart Korean Patent Application No. 2014-7021495 (2 pages).

* cited by examiner

HOT-WATER HEAT PUMP AND METHOD OF CONTROLLING THE SAME

TECHNICAL FIELD

The present invention relates to a hot-water heat pump and a method of controlling the same and relates, in particular, to temperature control of a hot-water route that is guided from a hot-water heat pump.

BACKGROUND ART

A hot-water route that supplies hot water is generally provided with a heat storage tank. In the hot water route, a portion of water stored in the heat storage tank absorbs heat from a thermal output heat exchanger provided in a hot-water-heat-pump main unit, thereby performing temperature control (for example, Patent Literature 1).

In addition, the size of openings of control valves provided in a heat-source route and a coolant route, which lead to the hot-water heat pump, are controlled in accordance with the temperature of the hot-water route (for example, Patent Literature 2 and Patent Literature 4).

CITATION LIST

Patent Literature

{PTL 1} Japanese Unexamined Patent Application, Publication No. Hei 7-225062.
{PTL 2} Publication of Japanese Patent, No. 2894602.
{PTL 3} Publication of Japanese Patent, No. 2842550.
{PTL 4} Publication of Japanese Patent, No. 3075944.

SUMMARY OF INVENTION

Technical Problem

However, the invention disclosed in Patent Literature 1 has a problem in that, because the heat storage tank is provided in the hot-water route, installation cost and installation space are required. The invention disclosed in Patent Literature 1 also has a problem in that, because water stored in the heat storage tank is circulated in the hot-water-heat-pump main unit to raise the temperature of water in the heat storage tank, raising the temperature is time consuming.

In addition, the inventions disclosed in Patent Literatures 2 to 4 have a problem in that, because the temperature of the hot-water route is controlled by controlling flow volumes, etc. of the heat-source route and the coolant route, it is impossible to follow temperature changes when the temperature of the hot-water route is changed abruptly.

The present invention has been conceived in light of the above-described circumstances, and an object thereof is to provide a hot-water heat pump that is capable of reducing the installation cost and installation space and also capable of reducing the heating time for the hot-water route, and a method of controlling the same.

Solution to Problem

In order to solve the above-described problems, the hot-water heat pump and the method of controlling the same according to the present invention employ the following solutions.

A hot-water heat pump according to a first aspect of the present invention is provided with a hot-water-heat-pump main unit that includes a thermal output heat exchanger that absorbs heat from a heat-source route and outputs heat; a hot-water route that receives the heat outputted from the thermal output heat exchanger; a three-way valve provided in the hot-water route; and a controller that controls the hot-water-heat-pump main unit and the three-way valve, wherein the controller controls the size of openings of the three-way valve so that a portion of the hot-water route outputted from the thermal output heat exchanger is guided to an upstream side of the thermal output heat exchanger.

A hot-water route that supplies hot water is conventionally provided with a heat storage tank. In the hot-water route, a portion of the water stored in this heat storage tank absorbs heat from a thermal output heat exchanger provided in the hot-water-heat-pump main unit, thereby controlling the temperature thereof.

With the first aspect of the present invention, the hot-water route directly absorbs heat from the thermal output heat exchanger without providing an additional device, etc. Accordingly, the heat is directly outputted to the hot-water route, thus increasing the heating speed for the hot-water route leading out of the thermal output heat exchanger. Therefore, the heating time of the hot-water route can be reduced, while also reducing the installation cost of the hot-water heat pump and the size of the hot-water heat pump.

In addition, the controller is provided, which controls the three-way valve so that a portion of the hot-water route whose temperature has been raised by absorbing heat from the thermal output heat exchanger forms a circulation path to the hot-water route that leads to the thermal output heat exchanger. Accordingly, the temperature of the hot-water route leading to the thermal output heat exchanger can be controlled by controlling the size of openings of the three-way valve. Therefore, even in the case in which the heating speed of the hot-water route increases by directly absorbing heat from the thermal output heat exchanger, it is possible to control temperature fluctuations in the hot-water route outputted from the thermal output heat exchanger.

The hot-water heat pump according to the first aspect of the present invention may be provided with an inlet-side-hot-water-route temperature detector provided in the hot-water route, which is guided to the thermal output heat exchanger; and an outlet-side-hot-water-route temperature detector provided in the hot-water route between the thermal output heat exchanger and the three-way valve, wherein the controller may control the size of openings of the three-way valve so that an inlet-side-hot-water-route temperature, which is detected by the inlet-side-hot-water-route temperature detector, reaches an inlet-side-hot-water-route target temperature.

The controller that controls the size of openings of the three-way valve in accordance with the inlet-side-hot-water-route temperature is provided. Accordingly, in the case in which the inlet-side-hot-water-route temperature of the hot-water route, which is guided to the thermal output heat exchanger, drops below the inlet-side-hot-water-route target temperature, the flow volume of the hot-water route that forms the circulation path from the three-way valve to the thermal output heat exchanger can be increased, and, in the case in which the inlet-side-hot-water-route temperature of the water-supply route, which leads to the thermal output heat exchanger, increases above the inlet-side-hot-water-route target temperature, the flow volume of the hot-water route that forms the circulation path from the three-way valve to the thermal output heat exchanger can be reduced.

Therefore, it is possible to suppress temperature fluctuations in the hot-water route guided to the thermal output heat exchanger.

In the hot-water heat pump according to the first aspect of the present invention, the controller may control a thermal output level from the hot-water-heat-pump main unit so that an outlet-side-hot-water-route temperature, which is detected by the outlet-side-hot-water-route temperature detector, reaches an outlet-side-hot-water-route target temperature.

The controller that controls the thermal output level of the hot-water-heat-pump main unit in accordance with the outlet-side-hot-water-route temperature is provided. By doing so, in the case in which the outlet-side-hot-water-route temperature drops below the outlet-side-hot-water-route target temperature, the thermal output level can be increased, and, in the case in which the outlet-side-hot-water-route temperature increases above the outlet-side-hot-water-route target temperature, the thermal output level can be reduced. Accordingly, it is possible to control the thermal output that the water-supply route receives from the thermal output heat exchanger. Therefore, it is possible to suppress temperature fluctuations in the hot-water route outputted from the thermal output heat exchanger.

In the hot-water heat pump according to the first aspect of the present invention, the size of openings of the three-way valve and the thermal output level may be feedback controlled by the controller.

The controller with which the size of openings of the three-way valve and the thermal output level are feedback controlled is provided. Accordingly, even in the case in which the inlet-side-hot-water-route temperature of the water-supply route guided to the thermal output heat exchanger fluctuates, it is possible to maintain the inlet-side-hot-water-route temperature at the inlet-side-hot-water-route target temperature. The controller with which the thermal output level is feedback controlled is also provided. Accordingly, it is possible to maintain the outlet-side-hot-water-route temperature of the water-supply route outputted from the thermal output heat exchanger at the outlet-side-hot-water-route target temperature. Therefore, even in the case in which temperature changes in the outlet-side-hot-water-route temperature cannot be suppressed only by controlling the three-way valve, it is possible to suppress the temperature fluctuations in the hot-water route outputted from the thermal output heat exchanger.

The hot-water heat pump according to the first aspect of the present invention may be provided with an upstream-inlet-side-hot-water-route temperature detector provided in an upstream-side of the hot-water route with which the hot-water route guided from the three-way valve joins; and an inlet-side flow-volume detector that detects the flow volume of the hot-water route, which is guided to the thermal output heat exchanger, wherein the controller may perform feedforward control of the size of openings of the three-way valve by using the upstream-inlet-side-hot-water-route temperature detected by the upstream-inlet-side-hot-water-route temperature detector and inlet-side flow volume detected by the inlet-side flow-volume detector.

The controller is provided, with which the size of openings of the three-way valve is feedforward controlled in accordance with the upstream-inlet-side-hot-water-route temperature of the upstream-side hot-water route to which the hot-water route, whose temperature has been raised, is joined via the three-way valve and the flow volume of the hot-water route on the inlet side of the thermal output heat exchanger to which the hot-water route, whose temperature has been raised, is joined. Accordingly, even in the case in which the temperature and the flow volume of the hot-water route abruptly change, it is possible to supply water, which has received the heat, to the thermal output heat exchanger by controlling the three-way valve. Therefore, it is possible to suppress temperature fluctuations in the hot-water route outputted from the thermal output heat exchanger.

In the hot-water heat pump according to the first aspect of the present invention, the controller may control the size of openings of the three-way valve in the light of a temperature compensation term used for making the outlet-side-hot-water-route temperature approach the outlet-side-hot-water-route target temperature by using the outlet-side-hot-water-route temperature.

The size of openings of the three-way valve is controlled on the basis of the outlet-side-hot-water-route temperature in the light of the temperature compensation term used for reducing the temperature difference between the outlet-side-hot-water-route temperature and the outlet-side-hot-water-route target temperature. Accordingly, even in the case in which the temperature of the hot-water route abruptly changes, it is possible to supply water, which has received the heat, to the thermal output heat exchanger by controlling the three-way valve. Therefore, it is possible to suppress the temperature fluctuations in the hot-water route outputted from the thermal output heat exchanger.

In addition, a hot-water heat pump control method according to a second aspect of the present invention is a hot-water heat pump control method of controlling a hot-water-heat-pump main unit and a three-way valve of a hot-water heat pump provided with a hot-water heat pump main unit that includes a thermal output heat exchanger that absorbs heat from a heat-source route and outputs heat, a hot-water route that receives the heat outputted from the thermal output heat exchanger, and a three-way valve provided in the hot-water route, the method including controlling the degree of opening of the three-way valve so that a portion of the hot-water route outputted from the thermal output heat exchanger is guided to an upstream side of the thermal output heat exchanger.

Advantageous Effects of Invention

A hot-water route directly absorbs heat from a thermal output heat exchanger without providing any additional device, etc. Accordingly, the heat is directly outputted to the hot-water route, thus increasing the heating speed of the hot-water route outputted from the thermal output heat exchanger. Therefore, the heating time of the hot-water route can be reduced while reducing the installation cost of the hot-water heat pump and the size of the hot-water heat pump.

In addition, a controller is provided, which controls a three-way valve so that a portion of the hot-water route whose temperature has been raised by absorbing heat outputted from the thermal output heat exchanger forms a circulation path to the hot-water route that is guided to the thermal output heat exchanger. Accordingly, the temperature of the hot-water route outputted from the thermal output heat exchanger can be controlled by controlling the size of openings of the three-way valve. Therefore, even in the case in which the heating speed of the hot-water route increases by directly absorbing heat from the thermal output heat exchanger, it is possible to control temperature fluctuations in the hot-water route outputted from the thermal output heat exchanger.

DESCRIPTION OF EMBODIMENTS

{First Embodiment}

Figure 1:
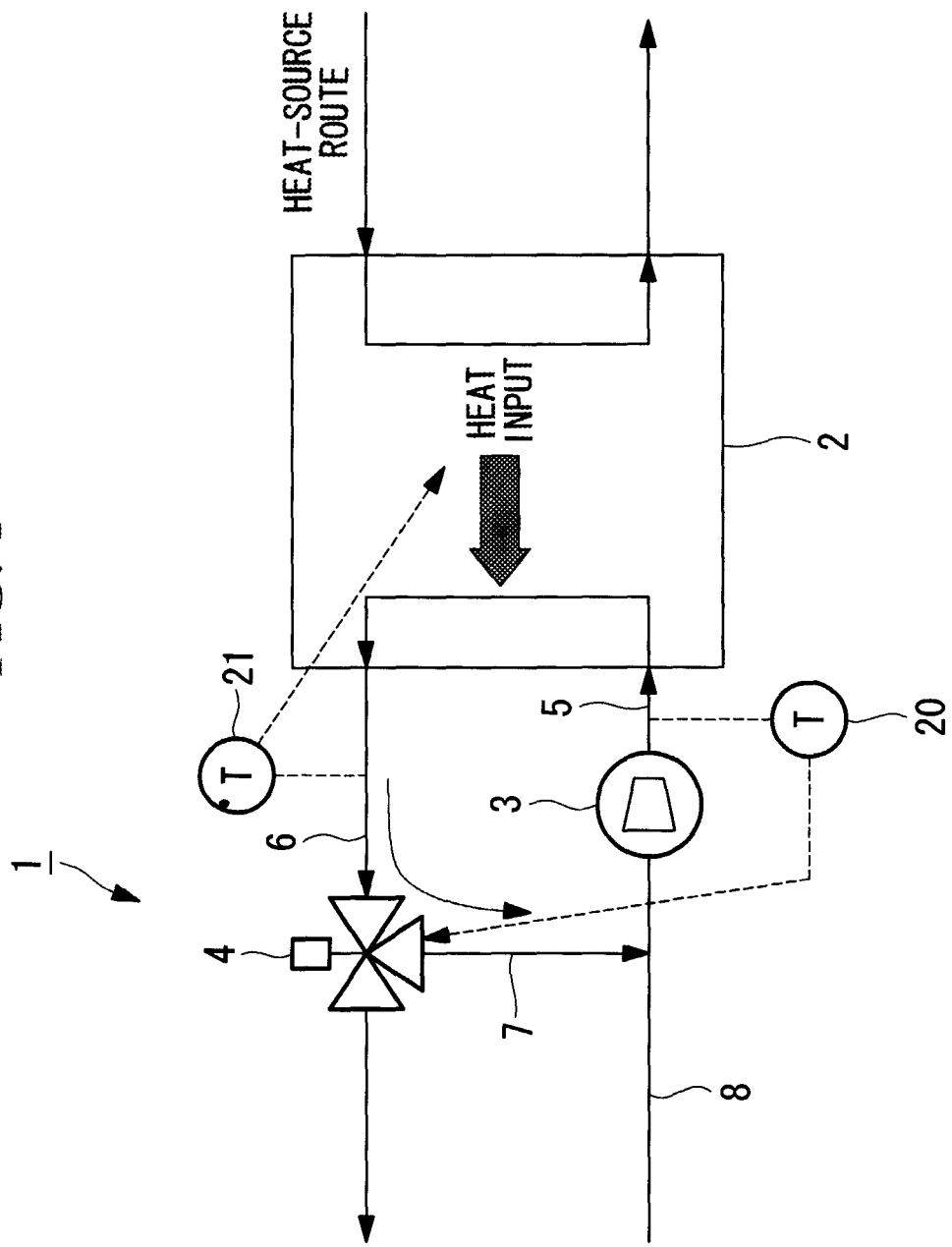
FIG. 1 is a diagram showing, in outline, the configuration of a hot-water heat pump according to a first embodiment of the present invention.

FIG. 1 is a diagram showing, in outline, the configuration of a hot-water heat pump according to a first embodiment of the present invention.

As shown in FIG. 1, a hot-water heat pump 1 is provided with a hot-water-heat-pump main unit 2, a water-supply pump 3, and a three-way valve 4.

The hot-water-heat-pump main unit 2 has a thermal output heat exchanger (not shown). The hot-water-heat-pump main unit 2 is typically a chiller in which the heat pump 1 can be operated, examples of which include an absorption chiller.

The thermal output heat exchanger absorbs heat from the heat-source route, which is guided to the thermal output heat exchanger, and outputs heat. The thermal output level absorbed at the thermal output heat exchanger is controlled by a controller (not shown). The heat resulting from the absorption at the thermal output heat exchanger is outputted to the hot-water route via the thermal output heat exchanger. The heat outputted to the hot-water route is supplied to an external load (not shown), such as a fan coil, etc.

A hot-water route (hereinafter, referred to as "upstream inlet-side hot-water route") 8, to which water is supplied from outside the hot-water heat pump 1, is pressurized by the water-supply pump 3. Pressurized water in a hot-water route (hereinafter, referred to as "inlet-side hot-water route") 5 is supplied to the thermal output heat exchanger. An inlet-side-hot-water-route temperature detector 20 that detects the temperature (inlet-side-hot-water-route temperature) of the inlet-side hot-water route 5 is provided between the water-supply pump 3 and the thermal output heat exchanger. The temperature of the upstream inlet-side hot-water route 8 and the initial temperature of the inlet-side hot-water route 5 are set to, for example, 30° C.

The inlet-side hot-water route 5, which is guided to the thermal output heat exchanger, absorbs heat by means of the thermal output heat exchanger and is guided to the thermal output heat exchanger. An outlet-side-hot-water-route temperature detector 21 is provided between a hot-water route (hereinafter, referred to as "outlet-side hot-water route") 6, which is outputted from the thermal output heat exchanger, and the three-way valve 4, described later. By absorbing heat from the thermal output heat exchanger, the temperature of the outlet-side hot-water route (outlet-side-hot-water-route temperature) detected by the outlet-side-hot-water-route temperature detector 21 is raised to, for example, 80° C.

The three-way valve 4, which is a flow-volume adjusting valve, is provided in the outlet-side hot-water route 6. A portion of the flow volume (hereinafter, referred to as "circulation hot-water route") 7 of the outlet-side hot-water route 6, whose temperature has been raised, is joined with the inlet-side hot-water route 5 by controlling the three-way valve 4 with the controller. The outlet-side hot-water route 6, whose temperature has been raised and which is not guided to the circulation hot-water route 7 via the three-way valve 4, is guided to outside the hot-water heat pump 1.

Temperature of the circulation hot-water route 7, which has joined with the upstream inlet-side hot-water route 8 via the three-way valve 4, becomes 75° C. by joining with the upstream inlet-side hot-water route 8 having a low temperature of, for example, 30° C., and the circulation hot-water route 7 is guided to the thermal output heat exchanger via the water supply pump 3. The inlet-side hot-water route 5 that has reached the thermal output heat exchanger is outputted with heat, which is the heat absorbed from the heat-source route.

Next, a method of controlling a hot-water heat pump according to the first embodiment of the present invention will be described.

Figure 2:
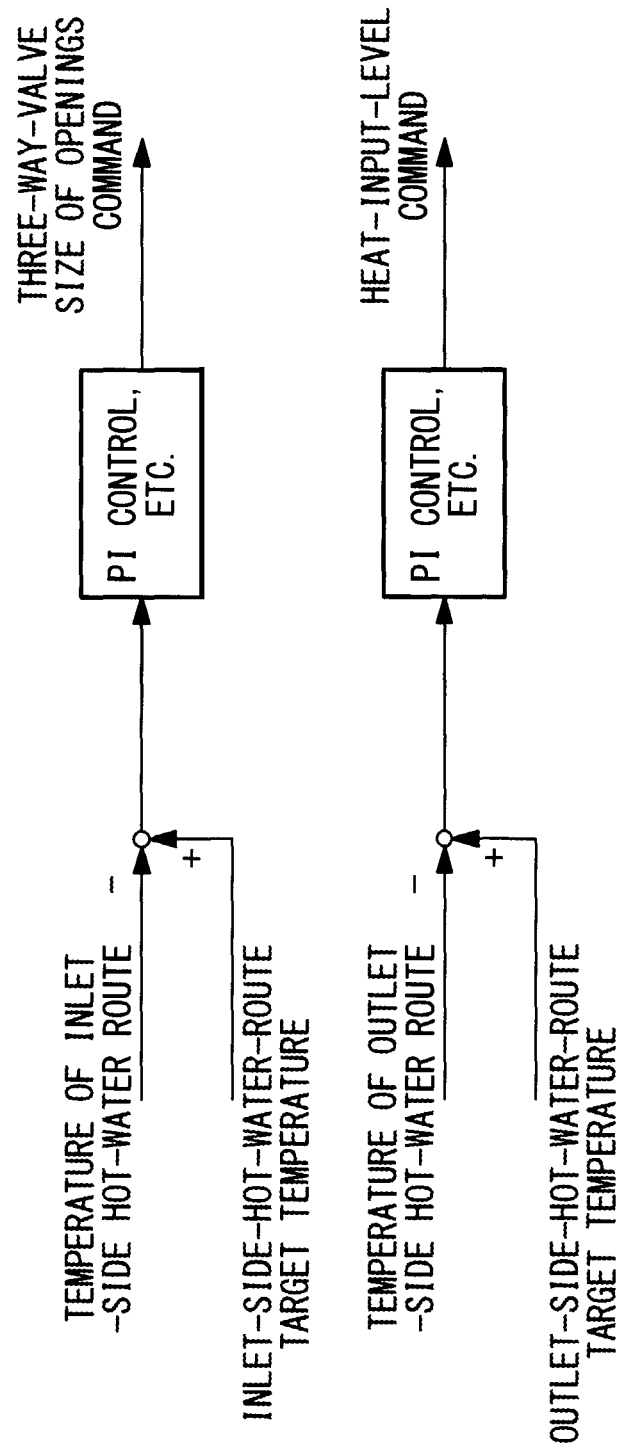
FIG. 2 is a block diagram for a method of controlling the hot-water heat pump according to the first embodiment of the present invention.

FIG. 2 is a block diagram showing a method of controlling the hot-water heat pump according to the first embodiment.

In the case in which temperature of the inlet-side hot-water route 5 detected by the inlet-side-hot-water-route temperature detector 20 has not reached an inlet-side-hot-water-route target temperature, the three-way valve 4 is feedback controlled so that the temperature of the inlet-side hot-water route 5 reaches the inlet-side-hot-water-route target temperature.

By doing so, in the case in which the temperature of the inlet-side hot-water route 5 guided to the thermal output heat exchanger drops below the inlet-side-hot-water-route target temperature, the flow volume of the circulation hot-water route 7 to be circulated from the three-way valve 4 to the thermal output heat exchanger can be increased, and, in the case in which the temperature of the inlet-side hot-water route 5 guided to the thermal output heat exchanger increases above the inlet-side-hot-water-route target temperature, the flow volume of the circulation hot-water route 7 to be circulated from the three-way valve 4 to the thermal output heat exchanger can be decreased.

Furthermore, in the case in which the temperature of the outlet-side hot-water route 6 detected by the outlet-side-hot-water-route temperature detector 21 has not reached an outlet-side-hot-water-route target temperature, the thermal output level of the hot-water-heat-pump main unit 2 is feedback controlled so that the temperature of the outlet-side hot-water route 6 matches the outlet-side-hot-water-route target temperature.

By doing so, in the case in which the temperature of the outlet-side hot-water route 6 drops below the outlet-side-hot-water-route target temperature, the thermal output level can be increased, and, in the case in which the temperature of the outlet-side hot-water route 6 increases over the outlet-side-hot-water-route target temperature, the thermal output level can be decreased. Accordingly, it is possible to control the heat that the inlet-side water-supply route 5 absorbs from the thermal output heat exchanger.

The three-way valve 4 is feedback controlled on the basis of the temperature of the inlet-side hot-water route 5 detected by the inlet-side-hot-water-route temperature detector 20, and the thermal output level of the hot-water-heat-pump main unit 2 is feedback controlled on the basis of the temperature of the outlet hot-water route 6 detected by the outlet-side-hot-water-route temperature detector 21; therefore, it is possible to prevent interference between the control of the three-way valve 4 and the control of the thermal output level.

As has been described above, the hot-water heat pump according to the first embodiment and the method of controlling the same afford the following effects and advantages.

The inlet-side hot-water route (hot-water route) 5 directly absorbs heat from the thermal output heat exchanger without providing any additional device, etc. Accordingly, because the heat is directly outputted to the inlet-side hot-water route 5, the heating speed is increased for the outlet-side hot-water route (hot-water route outputted from thermal output heat exchanger) 6.

Therefore, the heating time of the outlet-side hot-water route 6 can be reduced, while also reducing the installation cost of the hot-water heat pump 1 and the size of the hot-water heat pump 1.

In addition, the hot-water heat pump 1 according to the first embodiment is provided with the controller (not shown) that controls the three-way valve so that the circulation hot-water route 7, which holds a portion of flow volume in the outlet-side hot-water route 6 whose temperature has been raised by receiving heat from the thermal output heat exchanger, forms a circulation path to the inlet-side hot-water route (hot-water route guided to the thermal output heat exchanger) 5 via the upstream inlet-side hot-water route 8. Accordingly, the temperature of the inlet-side hot-water route 5 guided to the thermal output heat exchanger can be controlled by controlling the size of openings of the three-way valve 4. Therefore, even in the case in which the heating speed of the outlet-side hot-water route 6 may be increased by directly absorbing heat from the thermal output heat exchanger, it is possible to control temperature fluctuations of the temperature of the outlet-side hot-water route 6.

In addition, the hot-water heat pump 1 of the first embodiment is provided with the controller that controls the size of openings of the three-way valve 4 in accordance with the temperature of the inlet-side hot-water route 5. Accordingly, in the case in which the temperature of the inlet-side hot-water route 5 drops below the inlet-side-hot-water-route target temperature, the flow volume of the circulation hot-water route (hot-water route that forms the circulation path from the three-way valve 4 to the thermal output heat exchanger) 7 can be increased, and, in the case in which the temperature of the inlet-side hot-water route 5 increases above the inlet-side-hot-water-route target temperature, the flow volume of the circulation hot-water route 7 can be reduced. Therefore, it is possible to suppress temperature fluctuations in the inlet-side water-supply route 5, which is guided to the thermal output heat exchanger.

In addition, the hot-water heat pump 1 of the first embodiment is provided with the controller that controls the thermal output level of the hot-water-heat-pump main unit 2 in accordance with the temperature of the outlet-side hot-water route 6. By doing so, in the case in which the temperature of the outlet-side hot-water route 6 drops below the outlet-side-hot-water-route target temperature, the thermal output level can be increased, and, in the case in which the temperature of the outlet-side hot-water route 6 increases above the outlet-side hot-water-route target temperature, the thermal output level can be reduced. Accordingly, it is possible to control the heat that the inlet-side water-supply route 5 absorbs from the thermal output heat exchanger. Therefore, it is possible to suppress temperature fluctuations in the outlet-side hot-water route 6.

In addition, the hot-water heat pump 1 of the first embodiment is provided with the controller with which the size of openings of the three-way valve 4 and the thermal output level are feedback controlled. Accordingly, even in the case in which the temperature of the inlet-side hot-water route 5 fluctuates, it is possible to maintain the temperature of the inlet-side hot-water route 5 at the inlet-side-hot-water-route target temperature. The controller with which the thermal output level is feedback controlled is also provided. Accordingly, it is possible to maintain the temperature of the outlet-side hot-water route 6 at the outlet-side-hot-water-route target temperature. Therefore, even in the case in which temperature changes in the outlet-side hot-water route 6 cannot be suppressed only by controlling the three-way valve 4, it is possible to suppress the temperature fluctuations in the outlet-side hot-water route 6.

Figure 3:
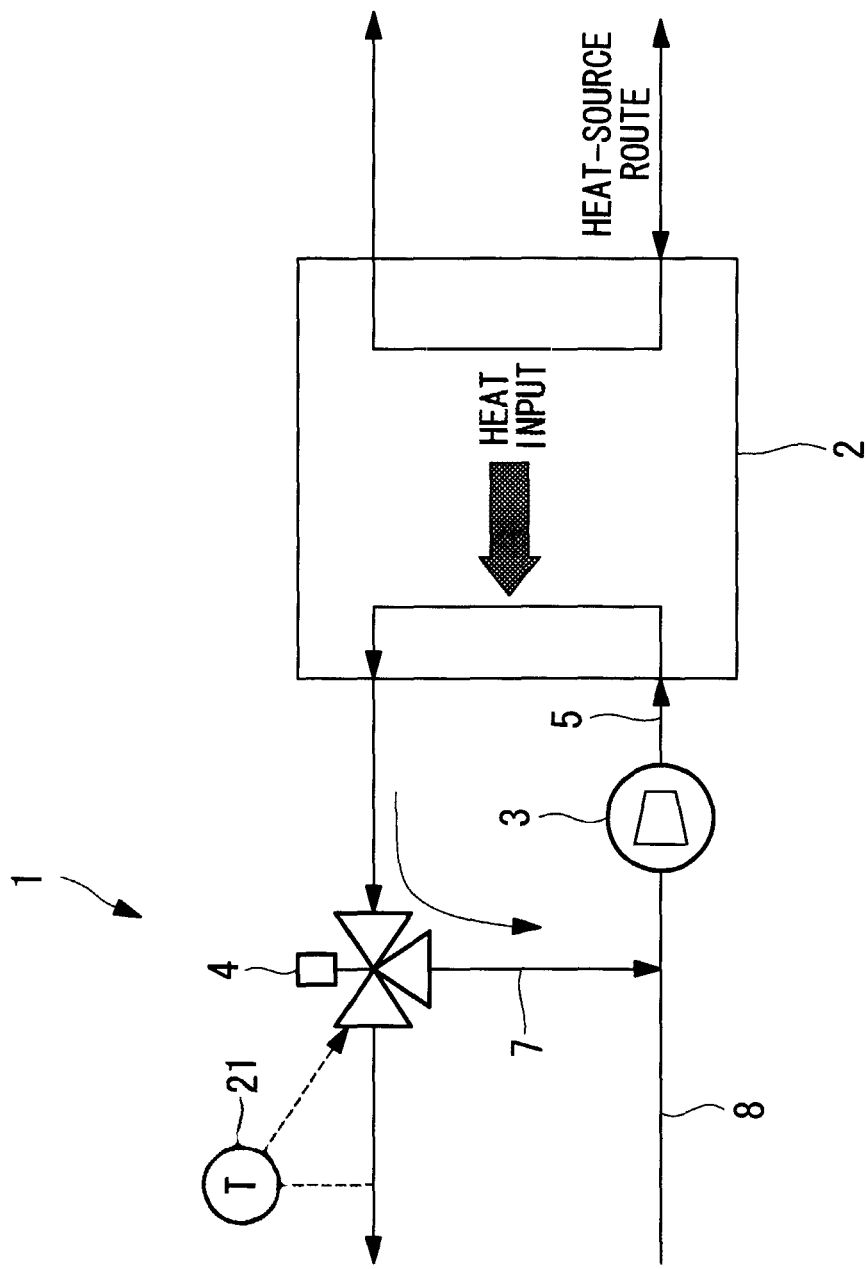
FIG. 3 is a diagram showing, in outline, the configuration of a modification of the hot-water heat pump according to the first embodiment of the present invention.

Note that, although the first embodiment has been described assuming that the output-side-hot-water-route temperature detector 21 is provided in the outlet-side hot-water route 6 between the three-way valve 4 and the thermal output heat exchanger, the present invention is not limited thereto, and the output-side-hot-water-route temperature detector 21 may be provided in the outlet-side hot-water route downstream of the three-way valve 4, as shown in FIG. 3.

{Second Embodiment}

A second embodiment of the present invention will be described below. A hot-water heat pump of the second embodiment and a method of controlling the same differ from those of the first embodiment in that a temperature detector is provided in the upstream inlet hot-water route; that a flow-volume detector is provided at an inlet of the thermal output heat exchanger; and that feedforward control is additionally included for the three-way valve; however, other points are the same as those of the first embodiment. Therefore, the components and control method that are the same as those of the first embodiment are given the same reference signs, and the descriptions thereof will be omitted.

Figure 4:
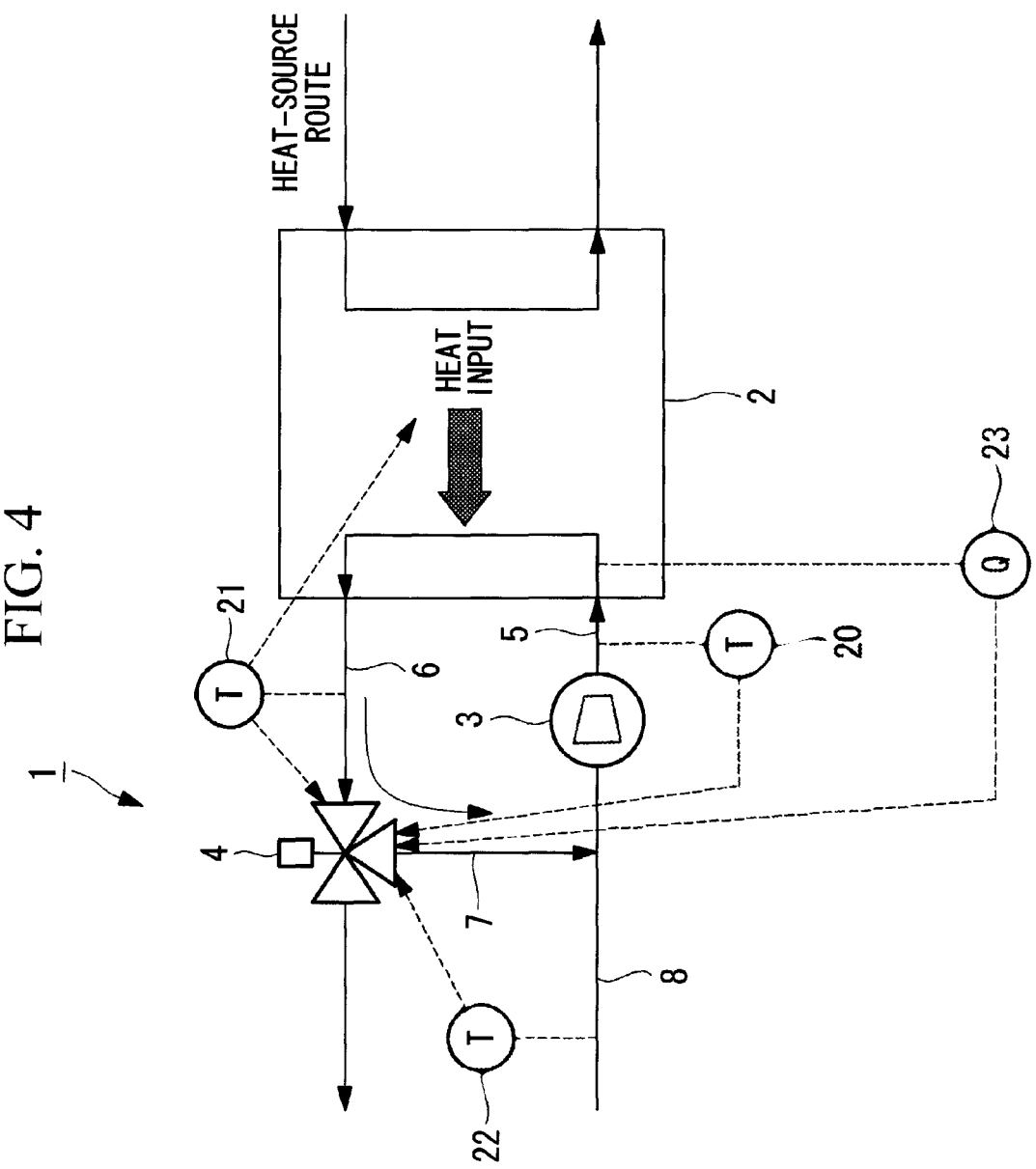
FIG. 4 is a diagram showing, in outline, the configuration of a hot-water heat pump according to a second embodiment of the present invention.

FIG. 4 is a diagram showing, in outline, the configuration of the hot-water heat pump according to the second embodiment.

The upstream inlet-side hot-water route 8 is provided with an upstream-inlet-side-hot-water-route temperature detector 22. The upstream-inlet-side-hot-water-route temperature detector 22 detects the temperature of the upstream inlet-side hot-water route 8 before joining the circulation hot-water route 7.

In addition, an inlet-side flow-volume detector 23 is provided at the inlet of the thermal output heat exchanger. The inlet-side flow-volume detector 23 detects the flow volume of the inlet-side hot-water route 5 guided to the thermal output heat exchanger.

Next, a method of controlling a hot-water heat pump according to the second embodiment of the present invention will be described.

Figure 5:
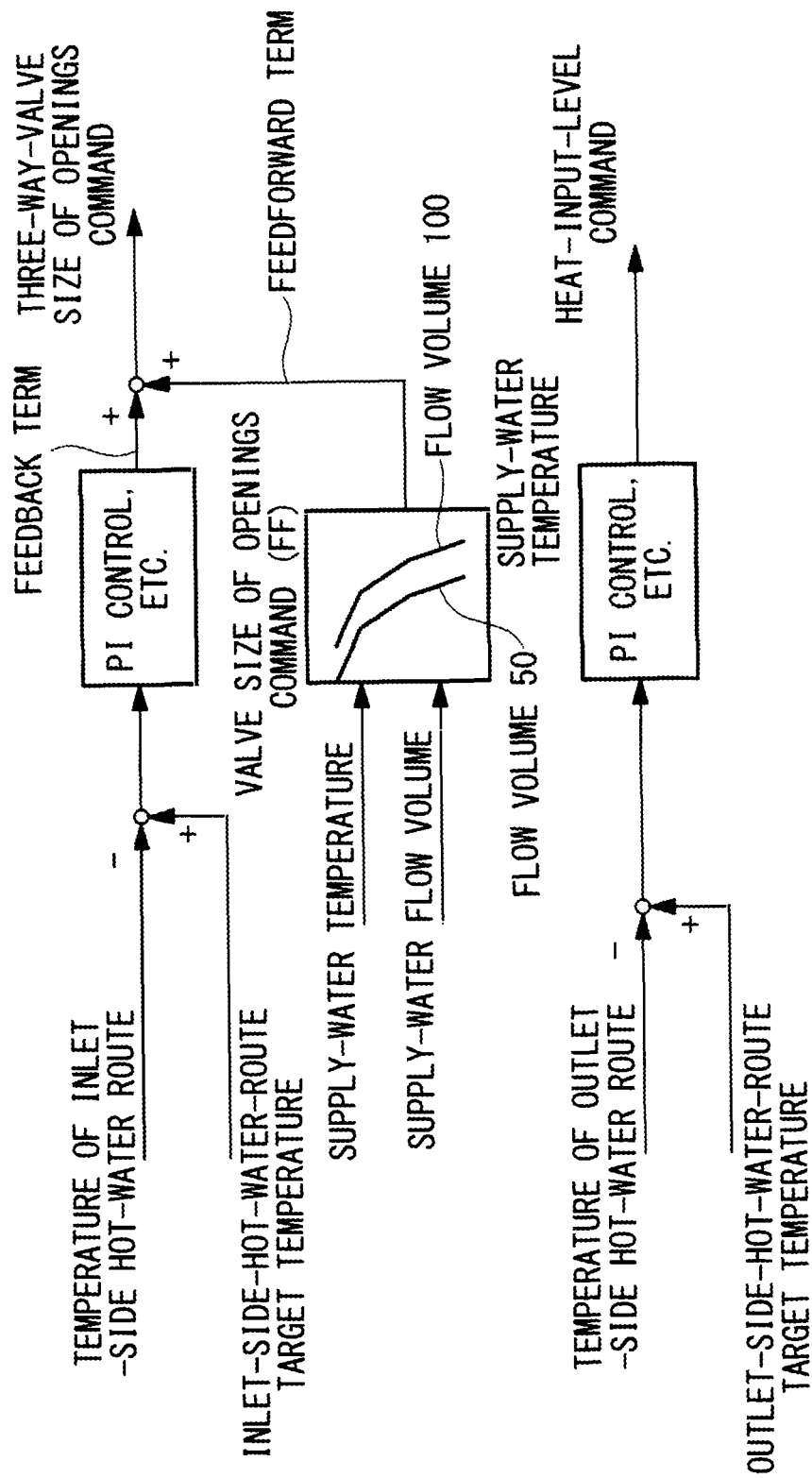
FIG. 5 is a block diagram for a method of controlling the hot-water heat pump according to the second embodiment of the present invention.

FIG. 5 is a block diagram showing a method of controlling the hot-water heat pump according to the second embodiment.

In the case in which the temperature of the inlet-side hot-water route 5 has not reached the inlet-side-hot-water-route target temperature, the three-way valve 4 is feedback controlled by the controller so that the temperature of the inlet-side hot-water route 5 reaches the inlet-side-hot-water-route target temperature.

Subsequently, the controller determines the size of openings of the three-way valve 4 on the basis of a table related to the temperature of the upstream inlet-side hot-water route 8 detected by the upstream-inlet-side-hot-water-route temperature detector 22 and the flow volume of the inlet-side hot-water route 5 detected by the inlet-side flow-volume detector 23.

The controller performs feedforward control for the size of openings of the three-way valve 4 determined from the table.

On the other hand, in the case in which the temperature of the outlet-side hot-water route 6 has not reached the outlet-side-hot-water-route target temperature, the thermal output level from the hot-water-heat-pump main unit 2 is feedback controlled by the controller so that the temperature of the outlet-side hot-water route 6 matches the outlet-side-hot-water-route target temperature.

As has been described above, the hot-water heat pump according to the second embodiment and the method of controlling the same afford the following effects and advantages.

The hot-water heat pump 1 of the second embodiment is provided with the controller, with which the size of openings of the three-way valve 4 is feedforward controlled in accordance with the temperature of the upstream inlet-side hot-water route (upstream-side hot-water route to which the hot-water route, whose temperature has been raised, is joined via the three-way valve 4) and the flow volume of the inlet-side hot-water route 5 at the inlet of the thermal output heat exchanger. Accordingly, even in the case in which the temperature and the flow volume of the upstream inlet-side hot-water route (hot-water route) 8 abruptly change, the temperature of the inlet-side hot-water route 5 guided to the thermal output heat exchanger can be controlled by controlling the three-way valve 4. Therefore, it is possible to suppress temperature fluctuations in the outlet-side hot-water route 6.

{Third Embodiment}

A third embodiment of the present invention will be described below. A hot-water heat pump of the third embodiment and a method of controlling the same differ from those of the first embodiment in that a temperature detector is provided in the upstream inlet-side hot-water route; that a flow-volume detector is provided at the inlet of the thermal output heat exchanger; that a temperature detector is provided in the heat-source route, which leads to the hot-water-heat-pump main unit; and that control of a temperature compensation term is additionally included for the three-way valve; however, other points are the same as those of the first embodiment. Therefore, the components and control method that are the same as those of the first embodiment are given the same reference signs, and the descriptions thereof will be omitted.

Figure 6:
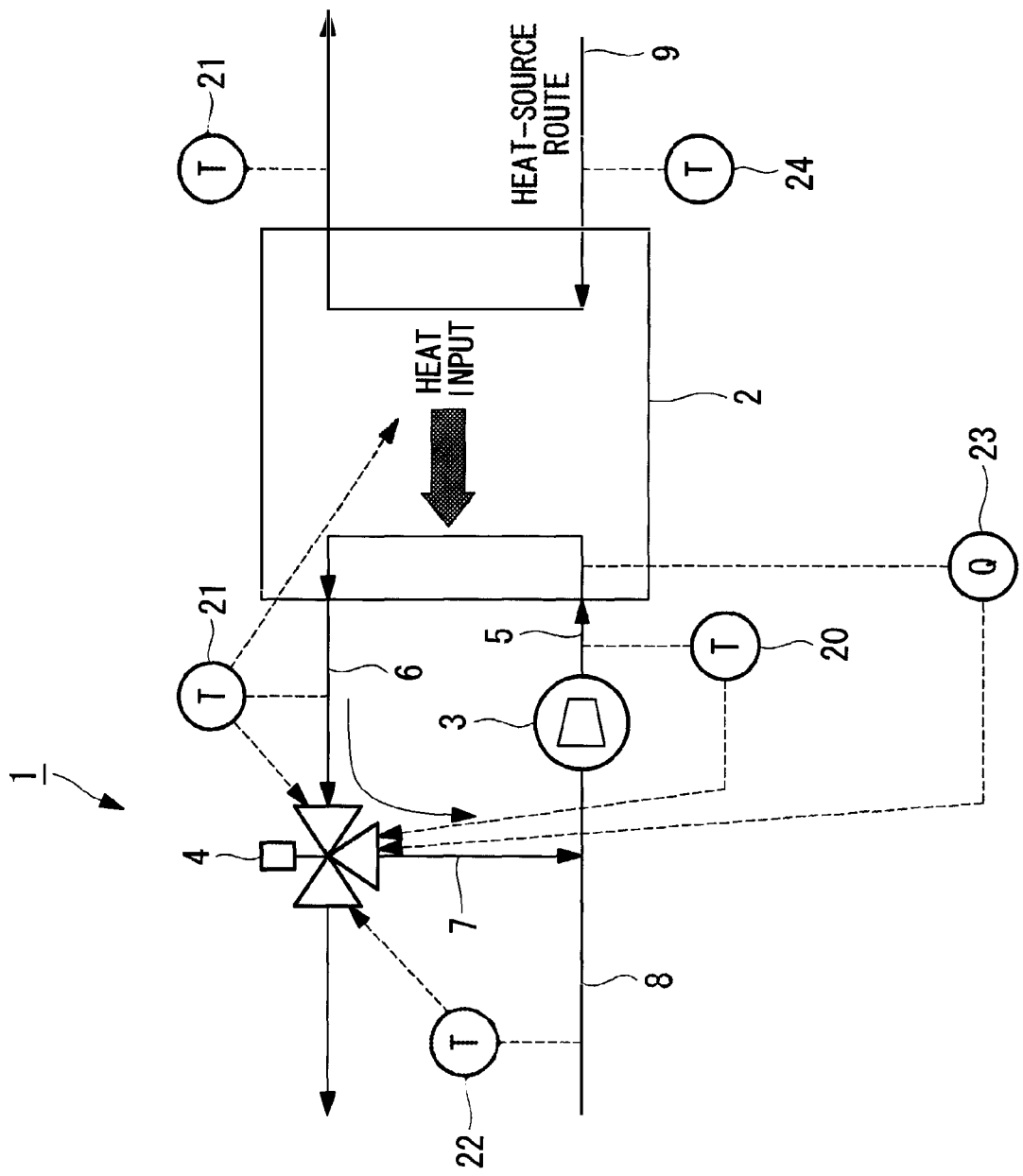
FIG. 6 is a diagram showing, in outline, the configuration of a hot-water heat pump according to a third embodiment of the present invention.

FIG. 6 is a diagram showing, in outline, the configuration of the hot-water heat pump according to the third embodiment.

The upstream inlet-side hot-water route 8 is provided with the upstream-inlet-side-hot-water-route temperature detector 22. The upstream-inlet-side-hot-water-route temperature detector 22 detects the temperature of the upstream inlet-side hot-water route 8.

The inlet-side flow-volume detector 23 is provided at the inlet of the thermal output heat exchanger. The inlet-side flow-volume detector 23 detects the flow volume of the inlet-side hot-water route 5 guided to the thermal output heat exchanger.

In addition, an inlet-side-heat-source-route temperature detector 24 is provided in the heat-source route (hereinafter, referred to as "inlet-side heat-source route") 9, which is guided to the thermal output heat exchanger. The inlet-side-heat-source-route temperature detector 24 detects the temperature of the inlet-side heat-source route 9.

Next, a method of controlling the hot-water heat pump according to the third embodiment of the present invention will be described.

Figure 7:
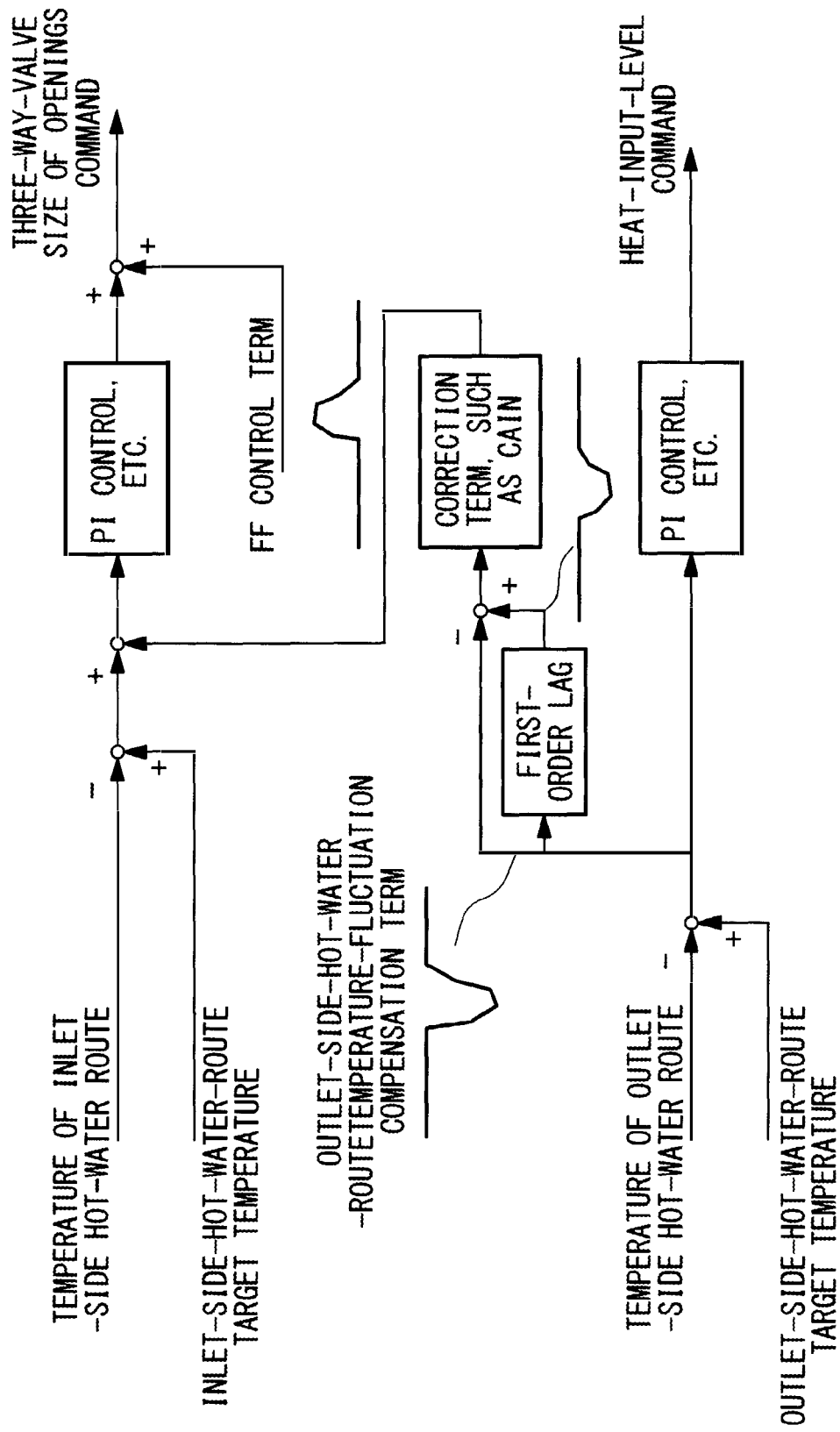
FIG. 7 is a block diagram for a method of controlling the hot-water heat pump according to the third embodiment of the present invention.

FIG. 7 is a block line diagram showing a method of controlling the hot-water heat pump according to the third embodiment.

In the case in which the temperature of the inlet-side hot-water route 5 has not reached the inlet-side-hot-water-route target temperature, the three-way valve 4 is feedback controlled by the controller so that the temperature of the inlet-side hot-water route 5 reaches the inlet-side-hot-water-route target temperature.

Furthermore, the controller determines the difference between the temperature of the inlet-side hot-water route 5 and the temperature of the outlet-side hot-water route 6. In the case in which this difference is larger than a predetermined difference, the controller inserts a first-order lag term. Subsequently, the controller controls the three-way valve 4 by including a temperature compensation term on the basis of the temperature of the outlet-side hot-water route 6 detected by the outlet-side-hot-water-route detector 21. The temperature compensation term performs temperature compensation so as to reduce a temperature difference between the temperature of the outlet-side hot-water route 6 and the outlet-side-hot-water-route target temperature.

Additionally, the controller determines the size of openings of the three-way valve 4 on the basis of a table related to the temperature of the upstream inlet-side hot-water route 8 detected by the upstream-inlet-side-hot-water-route temperature detector 22 and the flow volume of the inlet-side hot-water route 5 detected by the inlet-side flow-volume detector 23, and performs feedforward control for the size of openings of the three-way valve 4.

On the other hand, in the case in which the temperature of the outlet-side hot-water route 6 has not reached the outlet-side-hot-water-route target temperature, the thermal output level from the hot-water-heat-pump main unit 2 is feedback controlled by the controller so that the temperature of the outlet-side hot-water route 6 matches the outlet-side-hot-water-route target temperature.

As has been descried above, the hot-water heat pump according to the third embodiment and the method of controlling the same afford the following effects and advantages.

The hot-water heat pump 1 of the third embodiment is provided with the controller that controls the size of openings of the three-way valve 4 on the basis of the temperature of the outlet-side hot-water route 6 by including the temperature compensation term that performs temperature compensation so as to reduce the temperature difference (difference) between the temperature of the outlet-side hot-water route 6 and the outlet-side-hot-water-route target temperature. Accordingly, even in the case in which the temperature of the outlet-side hot-water route 6 abruptly changes, the temperature of the inlet-side hot-water route 5 leading to the thermal output heat exchanger can be controlled by controlling the three-way valve 4. Therefore, it is possible to suppress the temperature fluctuations in the outlet-side hot-water route 6 outputted from the thermal output heat exchanger.

Note that, although the third embodiment has been described assuming that the three-way valve 4 is controlled on the basis of the temperature of the outlet-side hot-water route 6 detected by the outlet-side-hot-water-route temperature detector 21 by including the temperature compensation term, the present invention is not limited thereto. For example, the three-way valve 4 may be controlled on the basis of the temperature of the inlet-side heat-source route 9 detected by the inlet-side-heat-source-route temperature detector 24 by including a temperature compensation term that performs temperature compensation so as to reduce the temperature difference between the temperature of the outlet-side hot-water route 6 and the outlet-side-hot-water-route target temperature.

Figure 8:
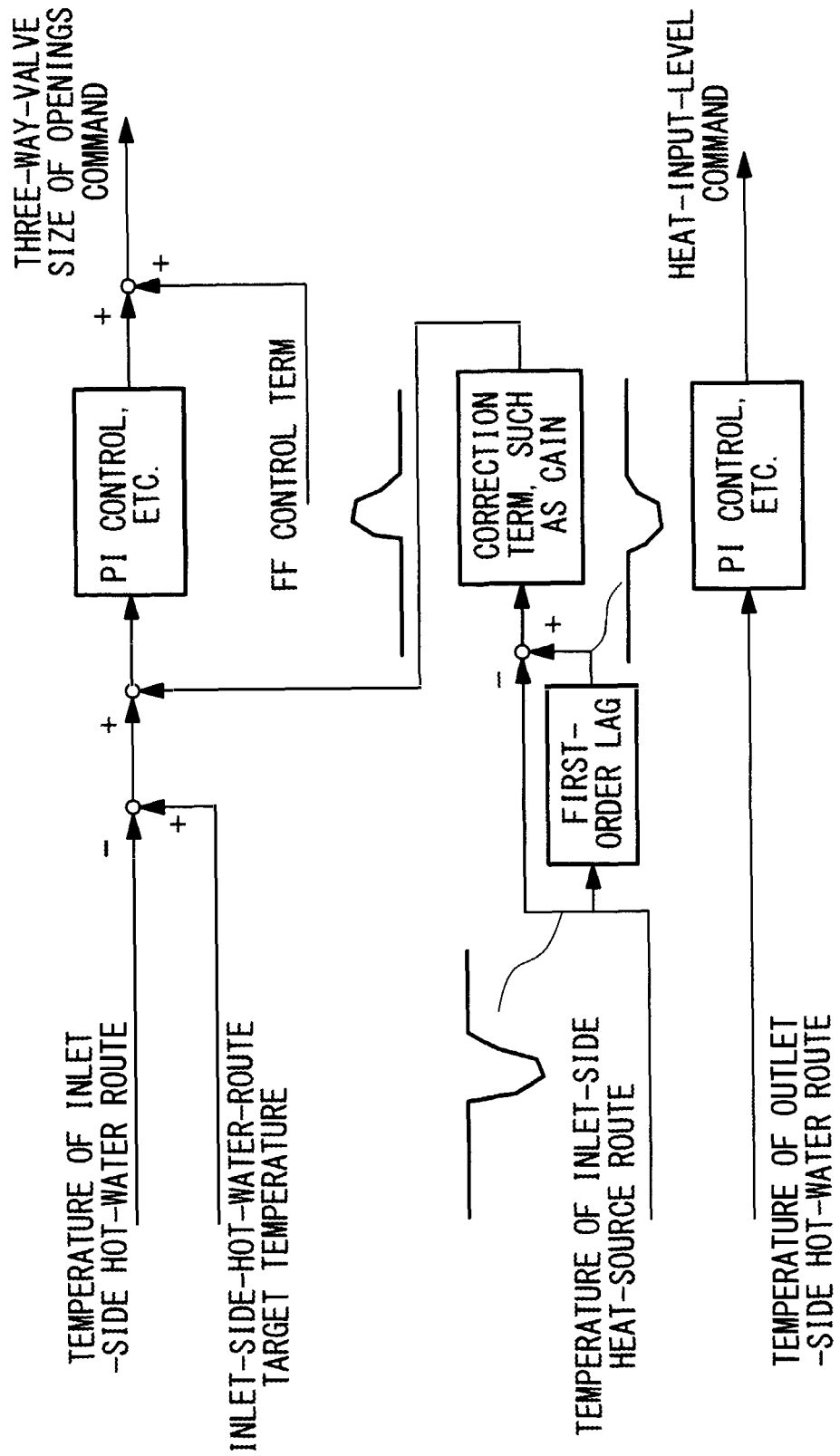
FIG. 8 is a block diagram for a modification of a method of controlling the hot-water heat pump according to the third embodiment of the present invention.

FIG. 8 shows, as a reference example, a block line diagram for a method of controlling a hot-water heat pump for this case.

In the case in which the temperature of the inlet-side hot-water route 5 has not reached the inlet-side-hot-water-route target temperature, the three-way valve 4 is feedback controlled by the controller so that the temperature of the inlet-side hot-water route 5 reaches the inlet-side-hot-water-route target temperature.

Furthermore, in the case in which the temperature of the inlet-side heat-source route 9 is higher or lower than the predetermined temperature, the controller inserts the first-order lag term. Subsequently, the controller controls the three-way valve 4 by including the temperature compensation term. The temperature compensation term performs temperature compensation so as to reduce the temperature difference between the temperature of the outlet-side hot-water route 6 and the outlet-side-hot-water-route target temperature, and it is determined on the basis of the temperature of the inlet-side heat-source route 9.

In addition, the controller determines the size of openings of the three-way valve 4 on the basis of a table related to the temperature of the upstream inlet-side hot-water route 8 detected by the upstream-inlet-side-hot-water-route temperature detector 22 and the flow volume of the inlet-side hot-water route 5 detected by the inlet-side flow-volume detector 23 and performs feedforward control for the degree of opening of the three-way valve 4.

Additionally, although this embodiment and the modification have been described assuming that the three-way valve 4 is controlled by inserting the first-order lag term, the first-order lag term may be omitted. It is also permissible that the feedforward control is not included.

REFERENCE SIGNS LIST

1 hot-water heat pump
2 hot-water-heat-pump main unit
4 three-way valve
5 hot-water route (inlet-side hot-water route)
6 hot-water route (outlet-side hot-water route)

The invention claimed is:

1. A hot-water heat pump comprising:
a hot-water-heat-pump main unit that includes a thermal output heat exchanger that absorbs heat from a heat-source route and outputs heat;
an upstream side hot water route which supplies water or hot water to the thermal output heat exchanger;
a hot-water route supplies hot water, which is made by heating the water or the hot water supplied by the upstream side hot water route at the thermal output heat exchanger, to the outside without making the hot water go through a heat storage tank;
the hot water route being fluidly independent from the heat-source route;
the upstream side hot water route being fluidly independent from the heat-source route;
a three-way valve provided in the hot-water route; and
a controller that controls the hot-water-heat-pump main unit and the three-way valve,
wherein the controller controls the size of openings of the three-way valve so that a portion of the hot water outputted from the thermal output heat exchanger and flowing in the hot water route is guided to the upstream side hot water route when the hot water is being supplied through the hot-water route to the outside without making the hot water go through the heat storage tank, and at that time, the controller controls the size of openings of the three-way valve according to the temperature of water in an inlet-side hot-water route which supplies water to the thermal output heat exchanger.

2. A hot-water heat pump according to claim 1, further comprising:
an inlet-side-hot-water-route temperature detector provided in the hot-water route, which is guided to the thermal output heat exchanger; and
an outlet-side-hot-water-route temperature detector provided in the hot-water route between the thermal output heat exchanger and the three-way valve,
wherein the controller controls the size of openings of the three-way valve so that an inlet-side-hot-water-route temperature, which is detected by the inlet-side-hot-water-route temperature detector, reaches an inlet-side-hot-water-route target temperature.

3. A hot-water heat pump according to claim 2, wherein the controller controls a thermal output level of the hot-water-heat-pump main unit so that an outlet-side-hot-water-route temperature, which is detected by the outlet-side-hot-water-route temperature detector, reaches an outlet-side-hot-water-route target temperature.

4. A hot-water heat pump according to claim 3, wherein the controller controls the size of openings of the three-way valve in the light of a temperature compensation term used for making the outlet-side-hot-water-route temperature approach the outlet-side-hot-water-route target temperature by using the outlet-side-hot-water-route temperature.

5. A hot-water heat pump according to claim 1, wherein the size of openings of the three-way valve and the thermal output level are feedback controlled by the controller.

6. A hot-water heat pump according to claim 1, further comprising:
an upstream-inlet-side-hot-water-route temperature detector provided in an upstream-side of the hot-water route with which the hot-water route guided from the three-way valve joins; and
an inlet-side flow-volume detector that detects the flow volume of the hot-water route, which is guided to the thermal output heat exchanger,
wherein the controller performs feedforward control of the size of openings of the three-way valve by using the upstream-inlet-side-hot-water-route temperature detected by the upstream-inlet-side-hot-water-route temperature detector and inlet-side flow volume detected by the inlet-side flow-volume detector.

7. A hot-water heat pump control method of controlling a hot-water heat-pump main unit and a three-way valve of a hot-water heat pump provided with the hot water heat pump main unit that includes a thermal output heat exchanger that absorbs heat from a heat-source route and outputs heat, an upstream side hot water route which supplies water or hot water to the thermal output heat exchanger, a hot-water route that supplies hot water, which is made by heating the water or the hot water supplied by the upstream side hot water route at the thermal output heat exchanger, to the outside without making the hot water go through a heat storage tank, and the three-way valve provided in the hot-water route, the hot water route being fluidly independent from the heat-source route, and the upstream side hot water route being fluidly independent from the heat-source route, the method comprising:

controlling the size of openings of the three-way valve so that a portion of the hot water outputted from the thermal output heat exchanger and flowing in the hot-water route is guided to the upstream side hot water route when the hot water is being supplied through the hot-water route to the outside without making the hot water go through the heat storage tank, and at that time, controlling the size of openings of the three-way valve according to the temperature of water in an inlet-side hot-water route which supplies water to the thermal output heat exchanger.

* * * * *